(12) United States Patent
Halldin et al.

(10) Patent No.: US 11,678,709 B2
(45) Date of Patent: Jun. 20, 2023

(54) HELMET

(71) Applicant: MIPS AB, Täby (SE)

(72) Inventors: Peter Halldin, Täby (SE); Kim Lindblom, Täby (SE)

(73) Assignee: MIPS AB

( * ) Notice: Subject to any disclaimer, the term of this patent is extended or adjusted under 35 U.S.C. 154(b) by 261 days.

(21) Appl. No.: 16/614,647

(22) PCT Filed: May 18, 2018

(86) PCT No.: PCT/EP2018/063193
§ 371 (c)(1),
(2) Date: Nov. 18, 2019

(87) PCT Pub. No.: WO2018/211106
PCT Pub. Date: Nov. 22, 2018

(65) Prior Publication Data
US 2020/0178636 A1    Jun. 11, 2020

(30) Foreign Application Priority Data

May 19, 2017    (GB) .................... 1708094.6

(51) Int. Cl.
*A42B 3/06* (2006.01)
*B32B 7/03* (2019.01)

(52) U.S. Cl.
CPC .............. *A42B 3/064* (2013.01); *A42B 3/068* (2013.01); *A42B 3/069* (2013.01); *B32B 7/03* (2019.01); *B32B 2307/56* (2013.01); *B32B 2437/04* (2013.01)

(58) Field of Classification Search
CPC ............ A42B 3/064; A42B 3/06; A42B 3/063
See application file for complete search history.

(56) References Cited

U.S. PATENT DOCUMENTS

| 3,208,080 A | 9/1965 | Hirsch |
| 4,134,155 A | 1/1979 | Robertson |
| 4,223,409 A * | 9/1980 | Lee .......................... A42B 3/28 2/411 |

(Continued)

FOREIGN PATENT DOCUMENTS

| AU | 2018269878 B2 | 10/2020 |
| CN | 1302189 A | 7/2001 |

(Continued)

OTHER PUBLICATIONS

Wen Gen-bao et al., "Mould design and manufacturing for the helmet shell with two side convex," Die and Mould Technology 4:21-25 (2015).

(Continued)

*Primary Examiner* — Shaun R Hurley
*Assistant Examiner* — Patrick J. Lynch
(74) *Attorney, Agent, or Firm* — Perkins Coie LLP

(57) ABSTRACT

A helmet having an energy absorbing layer, an outer layer that is harder than the energy absorbing layer and a plurality of outer plates mounted on the outer surface of the outer layer is provided. The outer plates on the outer layer can slide across the outer layer. A low friction interface between the outer surface of the outer layer and at least a part of the outer surface of the outer plates contacts the outer surface of the outer layer under an impact.

22 Claims, 10 Drawing Sheets

(56) References Cited

U.S. PATENT DOCUMENTS

| | | | |
|---|---|---|---|
| 5,956,777 A | 9/1999 | Popovich | |
| 6,378,140 B1* | 4/2002 | Abraham | A42B 3/064 2/411 |
| 8,850,622 B2 | 10/2014 | Finiel et al. | |
| 9,314,061 B2 | 4/2016 | Hanson et al. | |
| 10,143,256 B2 | 12/2018 | Straus | |
| 10,226,094 B2 | 3/2019 | Straus et al. | |
| 2004/0117896 A1 | 6/2004 | Madey et al. | |
| 2004/0250340 A1 | 12/2004 | Piper et al. | |
| 2004/0255369 A1 | 12/2004 | Puchalski | |
| 2005/0257312 A1* | 11/2005 | Puchalski | A42B 3/324 2/411 |
| 2007/0157370 A1 | 7/2007 | Joubert Des Ouches | |
| 2007/0226881 A1 | 10/2007 | Reinhard et al. | |
| 2009/0222976 A1 | 9/2009 | Loury et al. | |
| 2010/0115686 A1 | 5/2010 | Halldin | |
| 2011/0203024 A1 | 8/2011 | Morgan | |
| 2012/0017358 A1 | 1/2012 | Princip | |
| 2012/0105470 A1 | 5/2012 | Sugiyama | |
| 2014/0000012 A1 | 1/2014 | Mustapha | |
| 2014/0215694 A1 | 8/2014 | Grice | |
| 2015/0164173 A1* | 6/2015 | West | A42B 3/069 2/414 |
| 2015/0164174 A1* | 6/2015 | West | A42B 3/069 2/414 |
| 2016/0058093 A1 | 3/2016 | Kennard et al. | |
| 2016/0120255 A1 | 5/2016 | Alexander | |
| 2016/0227867 A1* | 8/2016 | Twardowski | B32B 5/30 |
| 2016/0255900 A1 | 9/2016 | Browd et al. | |
| 2016/0278469 A1 | 9/2016 | Williams | |
| 2016/0278470 A1 | 9/2016 | Posner et al. | |
| 2017/0013907 A1* | 1/2017 | Salmini | A42B 3/064 |
| 2017/0065018 A1 | 3/2017 | Lindsay | |
| 2017/0105470 A1 | 4/2017 | Eaton | |
| 2017/0188648 A1* | 7/2017 | Larrabee | A42B 3/063 |
| 2018/0042329 A1* | 2/2018 | Grice | A42B 3/064 |
| 2018/0132556 A1* | 5/2018 | Laperriere | A42B 3/121 |
| 2019/0059497 A1* | 2/2019 | Mesko | A42B 3/069 |

FOREIGN PATENT DOCUMENTS

| | | | |
|---|---|---|---|
| CN | 2563961 Y | 8/2003 | |
| CN | 202019831 U | 11/2011 | |
| CN | 102905570 A | 1/2013 | |
| CN | 103660304 A | 3/2014 | |
| CN | 104219975 A | 12/2014 | |
| CN | 105324048 A | 2/2016 | |
| EP | 2550886 A1 | 1/2013 | |
| FR | 3102648 A1 * | 5/2021 | A42B 3/064 |
| JP | 2000129529 A | 5/2000 | |
| JP | 2016535823 A | 11/2016 | |
| JP | 2020521064 A | 7/2020 | |
| KR | 10-202-0003151 A | 1/2020 | |
| TW | 492848 B | 7/2002 | |
| WO | 2001045526 A1 | 6/2001 | |
| WO | WO 2001045526 | 6/2001 | |
| WO | 03/005844 A1 | 1/2003 | |
| WO | 2011139224 A1 | 11/2011 | |
| WO | WO 2011/141562 | 3/2013 | |
| WO | WO 2015006240 A1 | 1/2015 | |
| WO | 2015/089646 A1 | 6/2015 | |
| WO | WO 2015/0103634 | 7/2015 | |
| WO | WO 2015103634 | 7/2015 | |
| WO | 2016/179369 A1 | 11/2016 | |
| WO | 2018129447 A1 | 7/2018 | |

OTHER PUBLICATIONS

3D Cad World, "Designing a Better Football Helmet", downloaded from https://www.3dcadworld.com/designing-a-better-football-helmet/, May 27, 2011, 7 pages.

* cited by examiner

HELMET

RELATED APPLICATIONS

This application is a 35 USC § 371 National Stage application of International Application No. PCT/EP2018/063193, entitled "HELMET," filed on May 18, 2018, which claims the benefit of United Kingdom Patent Application Number 1708094.6, filed May 19, 2017, the disclosures of which applications are incorporated herein by reference in their entireties for all purposes.

The present invention relates to helmets.

Helmets are known for use in various activities. These activities include combat and industrial purposes, such as protective helmets for soldiers and hard-hats or helmets used by builders, mine-workers, or operators of industrial machinery for example. Helmets are also common in sporting activities. For example, protective helmets are used in ice hockey, cycling, motorcycling, motor-car racing, skiing, snow-boarding, skating, skateboarding, equestrian activities, American football, baseball, rugby, cricket, lacrosse, climbing, airsoft and paintballing.

Helmets can be of fixed size or adjustable, to fit different sizes and shapes of head. In some types of helmet, e.g. commonly in ice-hockey helmets, the adjustability can be provided by moving parts of the helmet to change the outer and inner dimensions of the helmet. This can be achieved by having a helmet with two or more parts which can move with respect to each other. In other cases, e.g. commonly in cycling helmets, the helmet is provided with an attachment device for fixing the helmet to the user's head, and it is the attachment device that can vary in dimension to fit the user's head whilst the main body or shell of the helmet remains the same size. Such attachment devices for seating the helmet on a user's head may be used together with additional strapping (such as a chin strap) to further secure the helmet in place. Combinations of these adjustment mechanisms are also possible.

Helmets are often made of an outer shell, that is usually hard and made of a plastic or a composite material, and an energy absorbing layer called a liner. Nowadays, a protective helmet has to be designed so as to satisfy certain legal requirements which relate to, inter alia, the maximum acceleration that may occur in the centre of gravity of the brain at a specified load. Typically, tests are performed, in which what is known as a dummy skull equipped with a helmet is subjected to a radial blow towards the head. This has resulted in modern helmets having good energy-absorption capacity in the case of blows radially against the skull. Progress has also been made (e.g. WO 2001/045526 and WO 2011/139224, which are both incorporated herein by reference, in their entireties) in developing helmets to lessen the energy transmitted from oblique blows (i.e. which combine both tangential and radial components), by absorbing or dissipating rotational energy and/or redirecting it into translational energy rather than rotational energy.

Such oblique impacts (in the absence of protection) result in both translational acceleration and angular acceleration of the brain. Angular acceleration causes the brain to rotate within the skull creating injuries on bodily elements connecting the brain to the skull and also to the brain itself.

Examples of rotational injuries include Mild Traumatic Brain Injuries (MTBI) such as concussion, and more severe traumatic brain injuries such as subdural haematomas (SDH), bleeding as a consequence of blood vessels rapturing, and diffuse axonal injuries (DAI), which can be summarized as nerve fibres being over stretched as a consequence of high shear deformations in the brain tissue.

Depending on the characteristics of the rotational force, such as the duration, amplitude and rate of increase, either concussion, SDH, DAI or a combination of these injuries can be suffered. Generally speaking, SDH occur in the case of accelerations of short duration and great amplitude, while DAI occur in the case of longer and more widespread acceleration loads.

The present invention aims to at least partially address improve the performance of a helmet in the event of an oblique impact.

An aspect of the invention provides a helmet comprising:
  an energy absorbing layer;
  a relatively hard layer that is harder than the energy absorbing layer and is formed outward of the energy absorbing layer; and
  a plurality of outer plates mounted on the outer surface of the relatively hard layer;
    wherein the outer plates are mounted on the relatively hard layer such that, under an impact to an outer plate, the outer plate can slide across the relatively hard layer and move relative to other outer plates; and
    a low friction interface is provided between the outer surface of the relatively hard layer and at least a part of the surface of the outer plates that is in contact with the outer surface of the relatively hard layer under an impact to an outer plate.

The invention is described below by way of non-limiting examples, with reference to the accompanying drawings, in which.

Figure 6:
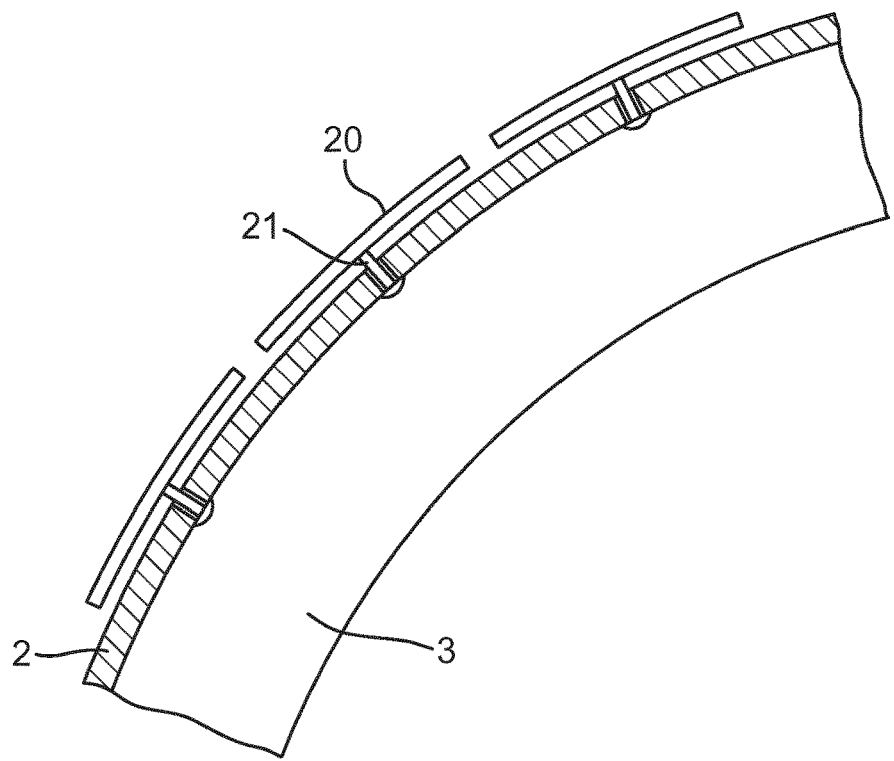

FIG. 6 schematically depicts an outer plate mounted to a helmet

Figure 13:
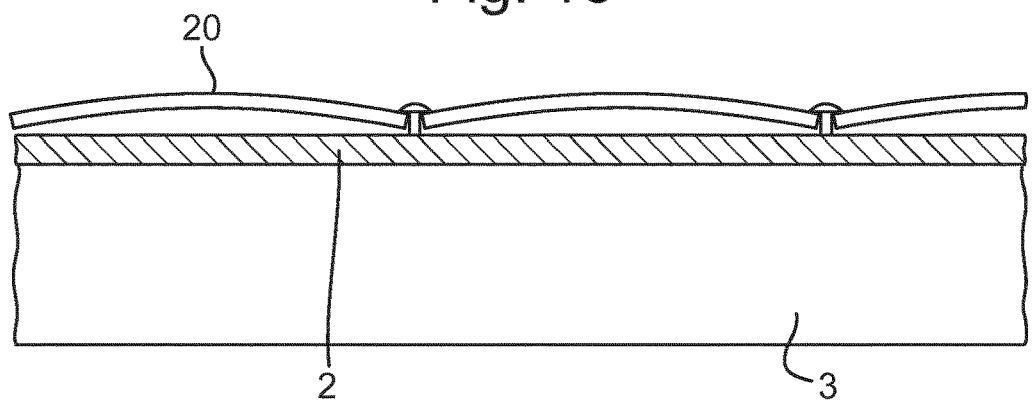
Figure 14:
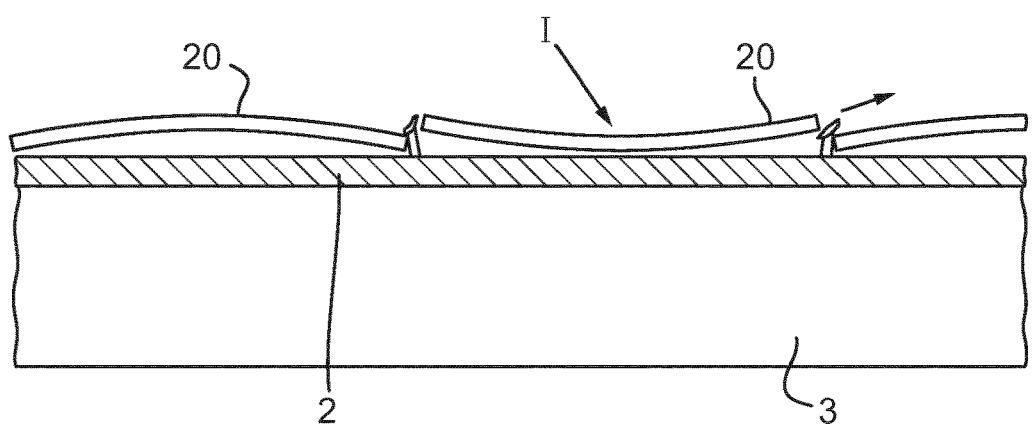
Figure 15:
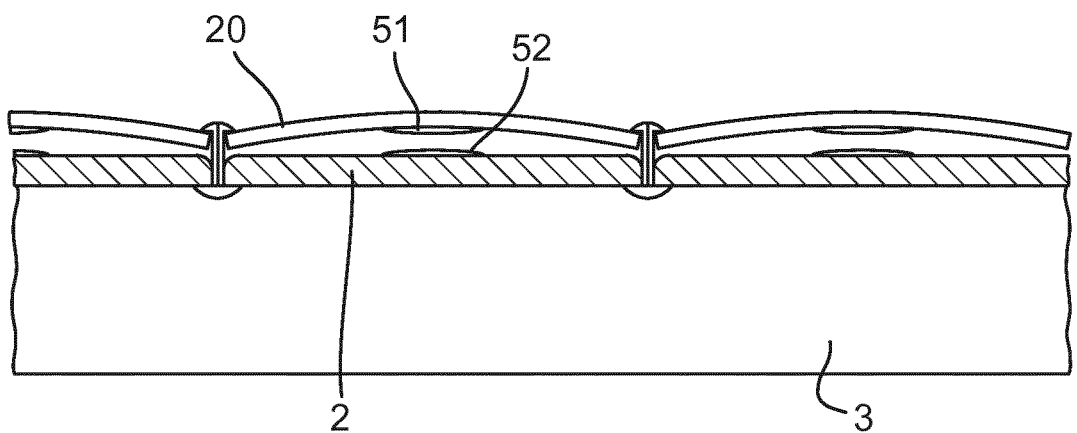
Figure 16:
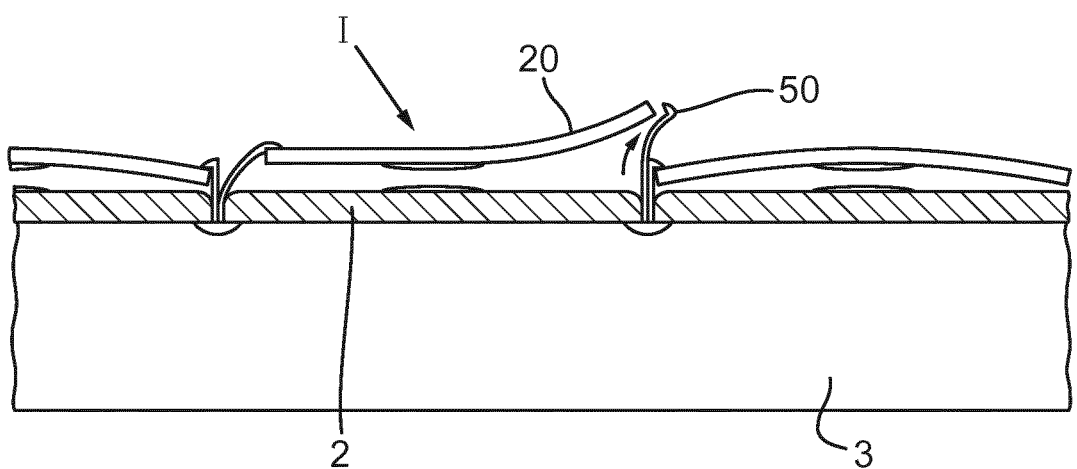
Figure 17:
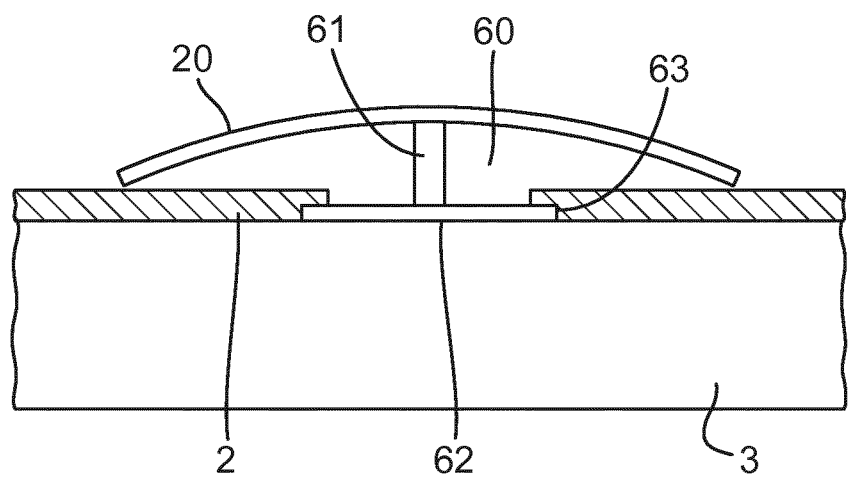
Figure 18:
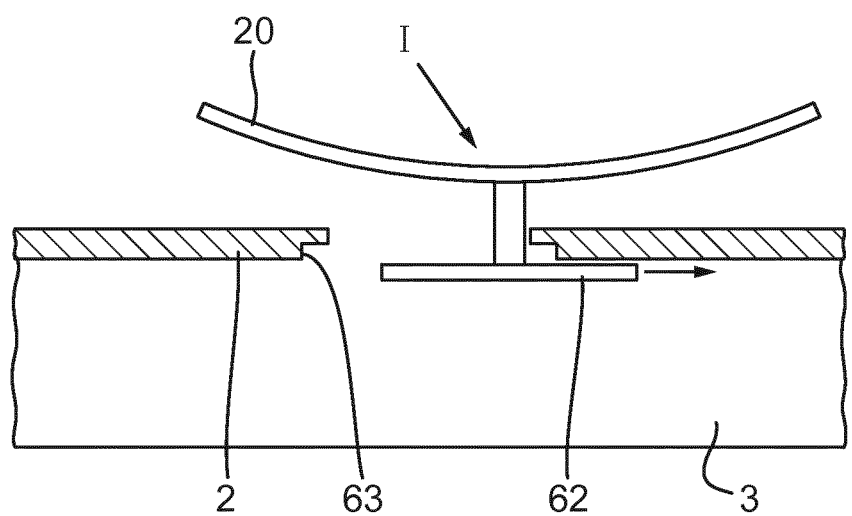
Figure 19:
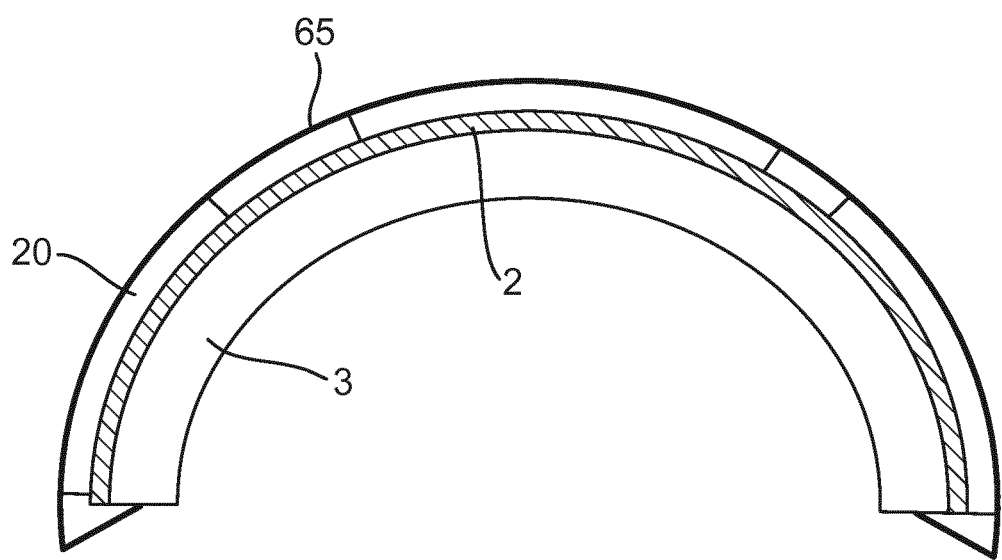
Figure 20:
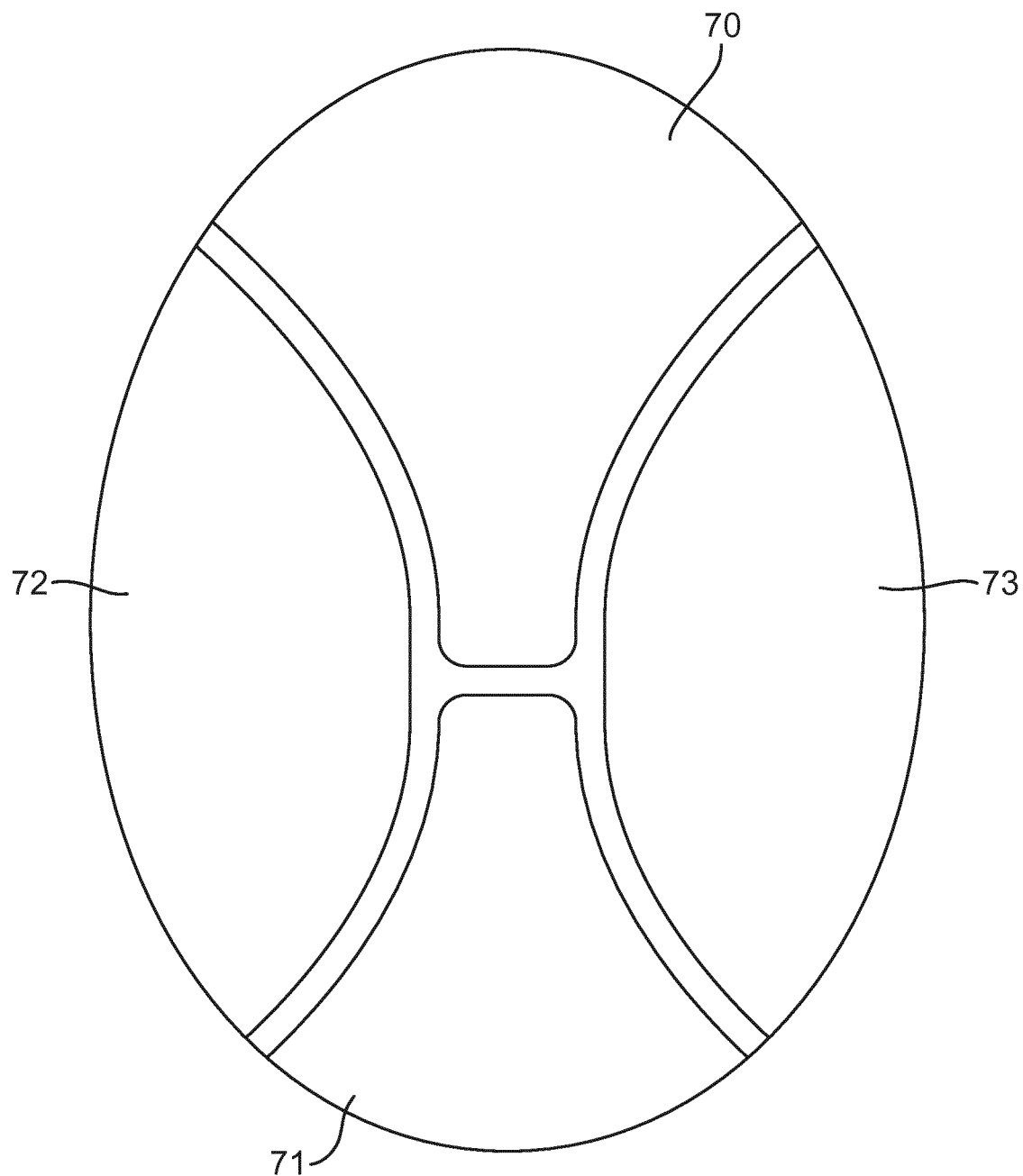

FIGS. 7 to 12 schematically depict alternative arrangements for connecting outer plates to helmets;

FIGS. 13 and 14 schematically depict an arrangement of outer plates before and after an impact, respectively;

FIGS. 15 and 16 schematically depicts an alternative arrangement of outer plates before and after an impact, respectively;

FIGS. 17 and 18 schematically depict a further alternative arrangement of a connection of an outer plate before and after an impact;

FIG. 19 schematically depicts an alternative arrangement of outer plates; and FIG. 20 depicts an arrangement of outer plates on a helmet.

The proportions of the thicknesses of the various layers and spacing between the layers in the helmets depicted in the figures have been exaggerated in the drawings for the sake of clarity and can of course be adapted according to need and requirements.

Figure 1:
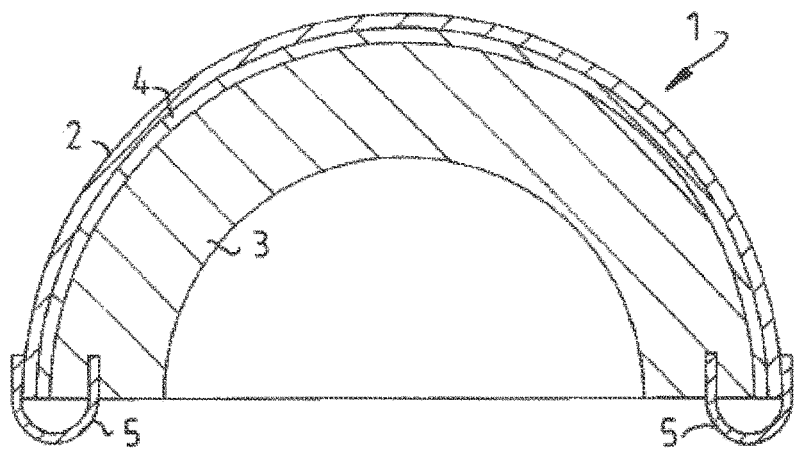
FIG. 1 depicts a cross section through a helmet for providing protection against oblique impacts.

FIG. 1 depicts a first helmet 1 of the sort discussed in WO 01/45526, intended for providing protection against oblique impacts. This type of helmet could be any of the types of helmet discussed above.

Protective helmet 1 is constructed with an outer shell 2 and, arranged inside the outer shell 2, an inner shell 3. An additional attachment device may be provided that is intended for contact with the head of the wearer.

Arranged between the outer shell 2 and the inner shell 3 is an intermediate layer 4 or a sliding facilitator, and thus makes possible displacement between the outer shell 2 and the inner shell 3. In particular, as discussed below, an intermediate layer 4 or sliding facilitator may be configured such that sliding may occur between two parts during an impact. For example, it may be configured to enable sliding under forces associated with an impact on the helmet 1 that is expected to be survivable for the wearer of the helmet 1. In some arrangements, it may be desirable to configure the sliding layer or sliding facilitator such that the coefficient of friction is between 0.001 and 0.3 and/or below 0.15.

Arranged in the edge portion of the helmet 1, in the FIG. 1 depiction, may be one or more connecting members 5 which interconnect the outer shell 2 and the inner shell 3. In some arrangements, the connecting members 5 may counteract mutual displacement between the outer shell 2 and the inner shell 3 by absorbing energy. However, this is not essential. Further, even where this feature is present, the amount of energy absorbed is usually minimal in comparison to the energy absorbed by the inner shell 3 during an impact. In other arrangements, connecting members 5 may not be present at all.

Further, the location of these connecting members 5 can be varied. For example, the connecting members may be positioned away from the edge portion, and connect the outer shell 2 and the inner shell 3 through the intermediate layer 4

The outer shell 2 may be relatively thin and strong so as to withstand impact of various types. The outer shell 2 could be made of a polymer material such as polycarbonate (PC), polyvinylchloride (PVC) or acrylonitrile butadiene styrene (ABS) for example. Advantageously, the polymer material can be fibre-reinforced, using materials such as glass-fibre, Aramid, Twaron, carbon-fibre, Kevlar or ultrahigh molecular weight polyethylene (UHMWPE).

The inner shell 3 is considerably thicker and acts as an energy absorbing layer. As such, it is capable of damping or absorbing impacts against the head. It can advantageously be made of foam material like expanded polystyrene (EPS), expanded polypropylene (EPP), expanded polyurethane (EPU), vinyl nitrile foam; or other materials forming a honeycomb-like structure, for example; or strain rate sensitive foams such as marketed under the brand-names Poron™ and D3O™. The construction can be varied in different ways, which emerge below, with, for example, a number of layers of different materials.

Inner shell 3 is designed for absorbing the energy of an impact. Other elements of the helmet 1 will absorb that energy to a limited extend (e.g. the hard outer shell 2 or so-called 'comfort padding' provided within the inner shell 3), but that is not their primary purpose and their contribution to the energy absorption is minimal compared to the energy absorption of the inner shell 3. Indeed, although some other elements such as comfort padding may be made of 'compressible' materials, and as such considered as 'energy absorbing' in other contexts, it is well recognised in the field of helmets that compressible materials are not necessarily 'energy absorbing' in the sense of absorbing a meaningful amount of energy during an impact, for the purposes of reducing the harm to the wearer of the helmet.

A number of different materials and embodiments can be used as the intermediate layer 4 or sliding facilitator, for example oil, gel, Teflon, microspheres, air, rubber, polycarbonate (PC), a fabric material such as felt, etc. Such a layer may have a thickness of roughly 0.1-5 mm, but other thicknesses can also be used, depending on the material selected and the performance desired. A layer of low friction plastics material such as PC is preferable for the intermediate layer 4. This may be moulded to the inside surface of the outer shell 2 (or more generally the inside surface of whichever layer it is directly radially inward of), or moulded to the outer surface of the inner shell 3 (or more generally the outside surface of whichever layer it is directly radially outward of). The number of intermediate layers and their positioning can also be varied, and an example of this is discussed below (with reference to FIG. 3B).

As connecting members 5, use can be made of, for example, deformable strips of rubber, plastic or metal. These may be anchored in the outer shell and the inner shell in a suitable manner.

Figure 2:
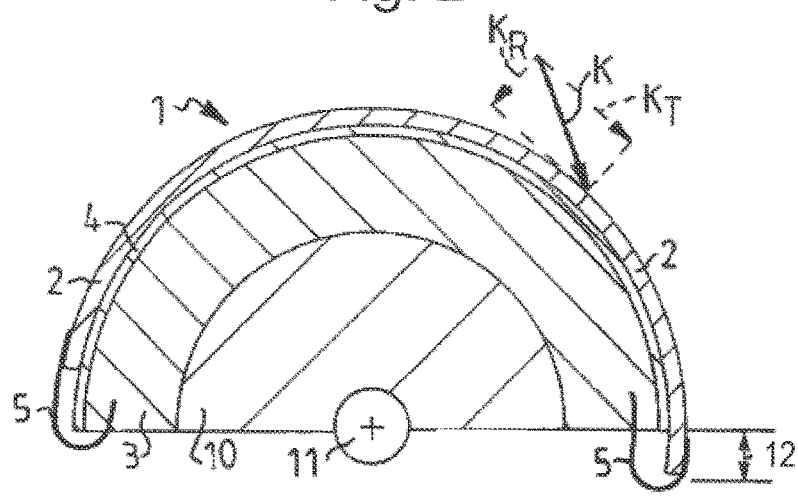
FIG. 2 is a diagram showing the functioning principle of the helmet of FIG. 1.

FIG. 2 shows the functioning principle of protective helmet 1, in which the helmet 1 and a skull 10 of a wearer are assumed to be semi-cylindrical, with the skull 10 being mounted on a longitudinal axis 11. Torsional force and torque are transmitted to the skull 10 when the helmet 1 is subjected to an oblique impact K. The impact force K gives rise to both a tangential force KT and a radial force KR against the protective helmet 1. In this particular context, only the helmet-rotating tangential force KT and its effect are of interest.

As can be seen, the force K gives rise to a displacement 12 of the outer shell 2 relative to the inner shell 3, the connecting members 5 being deformed. A reduction in the torsional force transmitted to the skull 10 of up to around 75%, and on average roughly 25% can be obtained with such an arrangement. This is a result of the sliding motion between the inner shell 3 and the outer shell 2 reducing the amount of rotational energy otherwise transferred to the brain.

Sliding motion can also occur in the circumferential direction of the protective helmet 1, although this is not depicted. This can be as a consequence of circumferential angular rotation between the outer shell 2 and the inner shell 3 (i.e. during an impact the outer shell 2 can be rotated by a circumferential angle relative to the inner shell 3). Although FIG. 2 shows the intermediate layer 4 remaining fixed relative to the inner shell 3 while the outer shell slides, alternatively, the intermediate layer 4 may remain fixed relative to the outer shell 2 while the inner shell 3 slides relative to the intermediate layer 4. Alternatively still, both the outer shell 2 and inner shell 3 may slide relative to the intermediate layer 4.

Figure 3A:
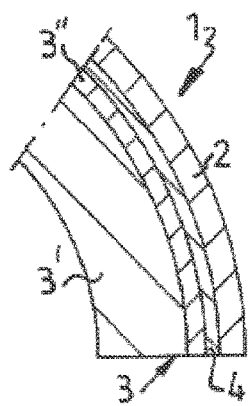
FIGS. 3A, 3B & 3C show variations of the structure of the helmet of FIG. 1.
Figure 3B:
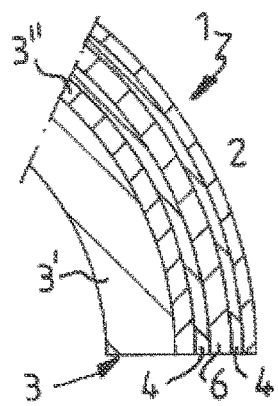
Figure 3C:
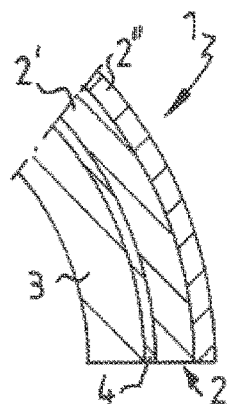

Other arrangements of the protective helmet 1 are also possible. A few possible variants are shown in FIG. 3. In FIG. 3*a*, the inner shell 3 is constructed from a relatively thin outer layer 3" and a relatively thick inner layer 3'. The outer layer 3" may be harder than the inner layer 3', to help facilitate the sliding with respect to outer shell 2. In FIG. 3*b*, the inner shell 3 is constructed in the same manner as in FIG. 3*a*. In this case, however, there are two intermediate layers 4, between which there is an intermediate shell 6. The two intermediate layers 4 can, if so desired, be embodied differently and made of different materials. One possibility, for example, is to have lower friction in the outer intermediate layer than in the inner. In FIG. 3*c*, the outer shell 2 is embodied differently to previously. In this case, a harder outer layer 2" covers a softer inner layer 2'. The inner layer 2' may, for example, be the same material as the inner shell 3. Although, FIGS. 1 to 3 show no separation in a radial direction between the layers, there may be some separation between layers, such that a space is provided, in particular between layers configured to slide relative to each other.

Figure 4:
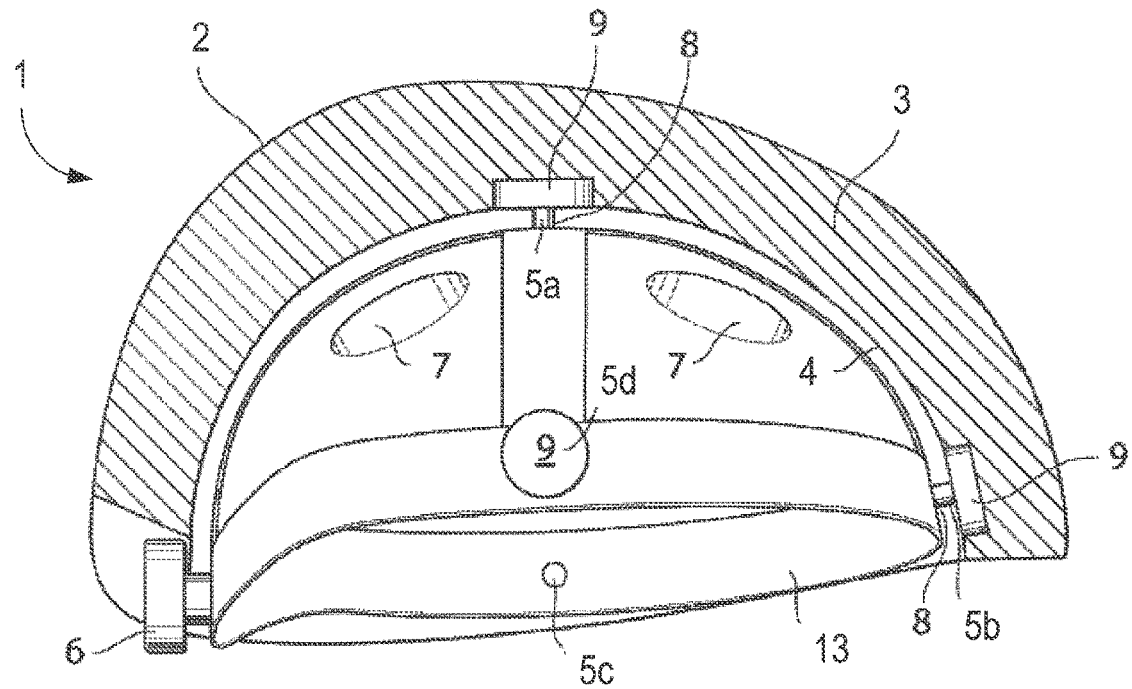
FIG. 4 is a schematic drawing of a another protective helmet.

FIG. 4 depicts a second helmet 1 of the sort discussed in WO 2011/139224, which is also intended for providing protection against oblique impacts. This type of helmet could also be any of the types of helmet discussed above.

In FIG. 4, helmet 1 comprises an energy absorbing layer 3, similar to the inner shell 3 of the helmet of FIG. 1. The outer surface of the energy absorbing layer 3 may be provided from the same material as the energy absorbing layer 3 (i.e. there may be no additional outer shell), or the outer surface could be a rigid shell 2 (see FIG. 5) equivalent to the outer shell 2 of the helmet shown in FIG. 1. In that case, the rigid shell 2 may be made from a different material than the energy absorbing layer 3. The helmet 1 of FIG. 4 has a plurality of vents 7, which are optional, extending through both the energy absorbing layer 3 and the outer shell 2, thereby allowing airflow through the helmet 1.

An attachment device 13 is provided, for attachment of the helmet 1 to a wearer's head. As previously discussed, this may be desirable when energy absorbing layer 3 and rigid shell 2 cannot be adjusted in size, as it allows for the different size heads to be accommodated by adjusting the size of the attachment device 13. The attachment device 13 could be made of an elastic or semi-elastic polymer material, such as PC, ABS, PVC or PTFE, or a natural fibre material such as cotton cloth. For example, a cap of textile or a net could form the attachment device 13.

Although the attachment device 13 is shown as comprising a headband portion with further strap portions extending from the front, back, left and right sides, the particular configuration of the attachment device 13 can vary according to the configuration of the helmet. In some cases the attachment device may be more like a continuous (shaped) sheet, perhaps with holes or gaps, e.g. corresponding to the positions of vents 7, to allow air-flow through the helmet.

FIG. 4 also depicts an optional adjustment device 6 for adjusting the diameter of the head band of the attachment device 13 for the particular wearer. In other arrangements, the head band could be an elastic head band in which case the adjustment device 6 could be excluded.

A sliding facilitator 4 is provided radially inwards of the energy absorbing layer 3. The sliding facilitator 4 is adapted to slide against the energy absorbing layer or against the attachment device 13 that is provided for attaching the helmet to a wearer's head.

The sliding facilitator 4 is provided to assist sliding of the energy absorbing layer 3 in relation to an attachment device 13, in the same manner as discussed above. The sliding facilitator 4 may be a material having a low coefficient of friction, or may be coated with such a material.

As such, in the FIG. 4 helmet, the sliding facilitator may be provided on or integrated with the innermost side of the energy absorbing layer 3, facing the attachment device 13.

However, it is equally conceivable that the sliding facilitator 4 may be provided on or integrated with the outer surface of the attachment device 13, for the same purpose of providing slidability between the energy absorbing layer 3 and the attachment device 13. That is, in particular arrangements, the attachment device 13 itself can be adapted to act as a sliding facilitator 5 and may comprise a low friction material.

In other words, the sliding facilitator 4 is provided radially inwards of the energy absorbing layer 3. The sliding facilitator can also be provided radially outwards of the attachment device 13.

When the attachment device 13 is formed as a cap or net (as discussed above), sliding facilitators 4 may be provided as patches of low friction material.

The low friction material may be a waxy polymer, such as PTFE, ABS, PVC, PC, Nylon, PFA, EEP, PE and UHMWPE, or a powder material which could be infused with a lubricant. The low friction material could be a fabric material. As discussed, this low friction material could be applied to either one, or both of the sliding facilitator and the energy absorbing layer The attachment device 13 can be fixed to the energy absorbing layer 3 and/or the outer shell 2 by means of fixing members 5, such as the four fixing members 5a, 5b, 5c and 5d in FIG. 4. These may be adapted to absorb energy by deforming in an elastic, semi-elastic or plastic way. However, this is not essential. Further, even where this feature is present, the amount of energy absorbed is usually minimal in comparison to the energy absorbed by the energy absorbing layer 3 during an impact.

According to the embodiment shown in FIG. 4 the four fixing members 5a, 5b, 5c and 5d are suspension members 5a, 5b, 5c, 5d, having first and second portions 8, 9, wherein the first portions 8 of the suspension members 5a, 5b, 5c, 5d are adapted to be fixed to the attachment device 13, and the second portions 9 of the suspension members 5a, 5b, 5c, 5d are adapted to be fixed to the energy absorbing layer 3.

Figure 5:
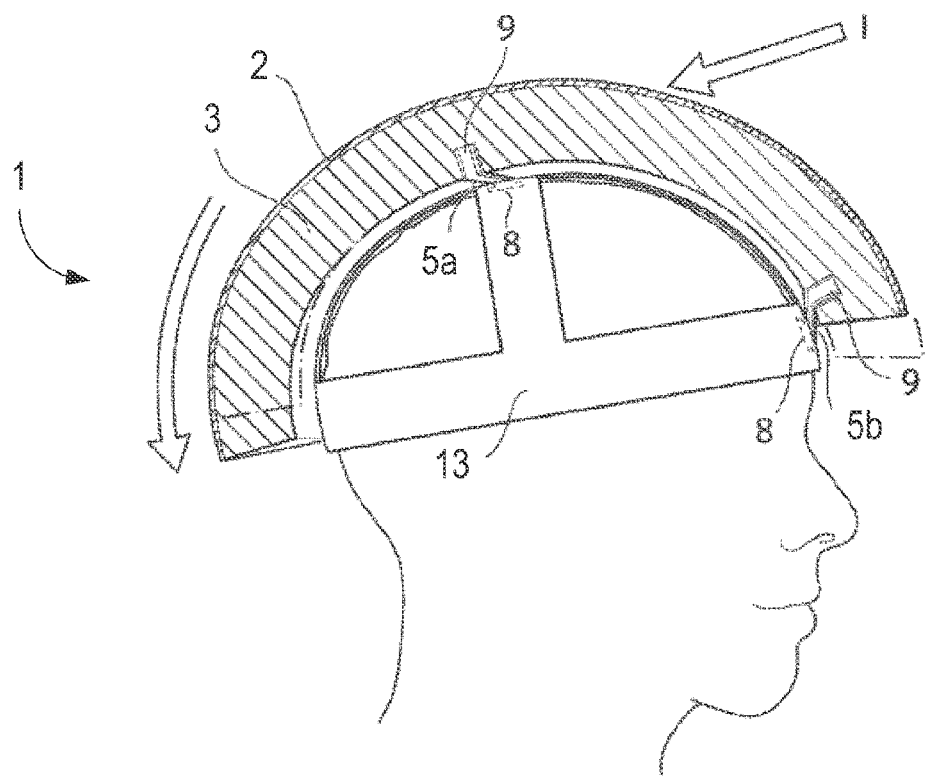
FIG. 5 depicts an alternative way of connecting the attachment device of the helmet of FIG. 4

FIG. 5 shows an embodiment of a helmet similar to the helmet in FIG. 4, when placed on a wearers' head. The helmet 1 of FIG. 5 comprises a hard outer shell 2 made from a different material than the energy absorbing layer 3. In contrast to FIG. 4, in FIG. 5 the attachment device 13 is fixed to the energy absorbing layer 3 by means of two fixing members 5a, 5b, which are adapted to absorb energy and forces elastically, semi-elastically or plastically.

A frontal oblique impact I creating a rotational force to the helmet is shown in FIG. 5. The oblique impact I causes the energy absorbing layer 3 to slide in relation to the attachment device 13. The attachment device 13 is fixed to the energy absorbing layer 3 by means of the fixing members 5a, 5b. Although only two such fixing members are shown, for the sake of clarity, in practice many such fixing members may be present. The fixing members 5 can absorb the rotational forces by deforming elastically or semi-elastically. In other arrangements, the deformation may be plastic, even resulting in the severing of one or more of the fixing members 5. In the case of plastic deformation, at least the fixing members 5 will need to be replaced after an impact. In some case a combination of plastic and elastic deformation in the fixing members 5 may occur, i.e. some fixing members 5 rupture, absorbing energy plastically, whilst other fixing members 5 deform and absorb forces elastically.

In general, in the helmets of FIG. 4 and FIG. 5, during an impact the energy absorbing layer 3 acts as an impact absorber by compressing, in the same way as the inner shell of the FIG. 1 helmet. If an outer shell 2 is used, it will help spread out the impact energy over the energy absorbing layer 3. The sliding facilitator 4 will also allow sliding between the attachment device and the energy absorbing layer. This allows for a controlled way to dissipate energy that would otherwise be transmitted as rotational energy to the brain. The energy can be dissipated by friction heat, energy absorbing layer deformation or deformation or displacement of the fixing members. The reduced energy transmission results in reduced rotational acceleration affecting the brain, thus reducing the rotation of the brain within the skull. The risk of rotational injuries including MTBI and more severe traumatic brain injuries such as subdural haematomas, SDH, blood vessel rapturing, concussions and DAI is thereby reduced.

In an arrangement according to the present invention, discussed in further detail below, a plurality of outer plates may be mounted to a helmet having at least an energy absorbing layer and a relatively hard layer formed outward of the energy absorbing layer. It should be understood that such an arrangement of outer plates may be added to any helmet according to any of the arrangements discussed above, namely having a sliding interface between at least two of the layers of the helmet. However, the features of helmets such as those discussed above are not essential to the present invention.

The outer plates may be mounted to the relatively hard layer in a manner that provides a low friction interface between the outer surface of the relatively hard layer and that least apart of surface of the outer plate that is in contact with the outer surface of the relatively hard layer, at least under an impact to an outer plate.

In addition, the manner of mounting the outer plates may be such that, under an impact to an outer plate, the outer plate can slide across the relatively hard layer and move relative to the other outer plate. In such an arrangement, in the event of an impact on the helmet, it can be expected that the impact would be incident on one or a limited number of the outer plates. Therefore, by configuring the helmet such that the one or more outer plates can move relative to the relatively hard layer and outer plates that have not been subject to an impact, the surface receiving the impact, namely one or a limited number of outer plates, can move relative to the remainder of the helmet. In the case of an oblique impact or a tangential impact, this may reduce the transfer of rotational forces to the remainder of the helmet. In turn, this may reduce the rotational acceleration imparted on the brain of a wearer of the helmet and/or reduce brain injuries.

The energy absorbing layer and the relatively hard layer formed outward of the energy absorbing layer may be formed from any of the materials discussed above for corresponding purposes.

For example, the relatively hard layer may be formed from various types of polymer material such as polycarbonate (PC), polyvinylchloride (PVC) or acrylonitrile butadiene styrene (ABS) for example. Advantageously, the polymer material can be fibre-reinforced, using materials such as glass-fibre, Aramid, Twaron, carbon-fibre, Kevlar or ultra-high molecular weight polyethylene (UHMWPE).

The energy absorbing layer may be made from, for example, foam material like expanded polystyrene (EPS), expanded polypropylene (EPP), expanded polyurethane (EPU), vinyl nitrile foam; or other materials forming a honeycomb-like structure, for example; or strain rate sensitive foams such as marketed under the brand-names Poron™ and D3O™.

The outer plates may be made from any one of the materials discussed above for the formation of the relatively hard layer. It should be appreciated that in the case of a helmet having a relatively hard layer and a plurality of outer plates, the relatively hard layer and the outer plates may be formed from different materials or from the same material.

In order to provide a low friction interface between the outer surface of the relatively hard layer and the inner surface of the outer plates, any of the arrangements discussed above for the provision of a sliding interface or sliding facilitator may be used. For example, the low friction interface may be provided by the selection of materials for the relatively hard layer and the outer plates in order to ensure that the friction is sufficiently low that, under the forces associated with an impact that the helmet is designed to withstand, the outer plates can slide relative to the relatively hard layer.

Alternatively or additionally, a low friction layer may be integrated in one or both of the surfaces and/or a coating may be applied to one or more of the surfaces formed from a low friction material and/or an intermediate layer formed from a low friction material may be provided between these surfaces.

A suitable low friction material may be a waxy polymer, such as PTFE, ABS, PVC, PC, Nylon, PFA, EEP, PE and UHMWPE, or a powder material which could be infused with a lubricant. The low friction material could be a fabric material.

In some arrangements, it may be desirable to configure the friction interface such that the coefficient of friction is between 0.001 and 0.3 and/or below 0.15.

In an arrangement, the plurality of outer plates form the outmost layer of the helmet. It should be understood that, although the outer plates may form the outer most layer of the helmet in functional terms, a further layer may be provided outside the helmet for aesthetic reasons. Accordingly, a thin layer, or skin, could be formed outwardly of the outer plates if it is desirable for the appearance of the product. Such an outer skin may not significantly affect the performance of the helmet itself. Alternatively, the outer plates may not be covered in any way such that, when an impact strikes the helmet, it is applied directly to the outer surface of the outer plate.

Each outer plate may have one or more connectors associated with the outer plate that are arranged to secure the outer plate to the remainder of the helmet in the absence of an impact. In particular, the connectors may be configured such that, in the absence of an impact on an outer plate, the outer plate does not move relative to the relatively hard layer but, under an impact to the outer plate, the outer plate can move relative to the relatively hard layer.

In an arrangement, the connectors may be distinct components connected between the outer plates and the remainder of the helmet. A variety of examples of arrangements for connecting the outer plates to the remainder of the helmet are discussed below. However, it should be appreciated that in general any mechanical fixing may be used, including for example, conventional fixings such as screws.

In an arrangement, at least one connector for connecting an outer plate to the remainder of the helmet may be integrally formed with at least one of the outer plate and a part of the remainder of the helmet.

As shown in FIG. 6, a connector 21 may be provided in, and connect to, a central region of an outer plate 20. In other arrangements, discussed below, a connector may be provided at an edge of the outer plate 20. It should also be appreciated that in some arrangements, a combination may be used. Such an arrangement may include at least one connector 21 in a central region of the outer plate 20 and at least one connector provided at an edge of the outer plate 20.

Where connectors are provided at an edge of an outer plate 20, they may be provided between the outer plate 20 and the remainder of the helmet and/or may be provided between adjacent outer plates 20.

The connectors arranged to connect the outer plates 20 to the remainder of the helmet may, as depicted in FIG. 6, be arranged to connect to the relatively hard layer 2. Alternatively or additionally, one or more connectors may be configured to connect the outer plates 20 to the energy absorbing layer 3.

At least one connector may be configured such that, under an impact to an outer plate, the connector deforms, permitting the outer plate 20 to move from the positon in which it is secured when there is no impact. The connector may be configured such that the deformation is an elastic deformation, for example, such that, after the impact, the outer plate may return to its original position relative to the relatively hard layer. For example, the connector may be formed from an elastomer, such as a rubber material.

A connector such as the connector 21 depicted in FIG. 6 may have an elongate shape that, under an impact, stretches, namely becomes longer, to permit movement of the outer plate 20 relative to the relatively hard layer 2.

In an arrangement, at least one connector may be formed from a section of elastic fabric that connects part of an outer plate to the remainder of the helmet such that movement of the outer plate can occur by stretching one side of the section of elastic fabric. In a particular arrangement, the elastic fabric used to connect the outer plates to the remainder of the helmet is arranged between the outer plates and the relatively hard layer and functions as at least part of the low friction interface.

In an arrangement, at least one connector may be formed from a shear weak material that, under an oblique impact on the outer plate, shears, permitting the movement of the outer plate relative to the relatively hard layer.

Figure 7:
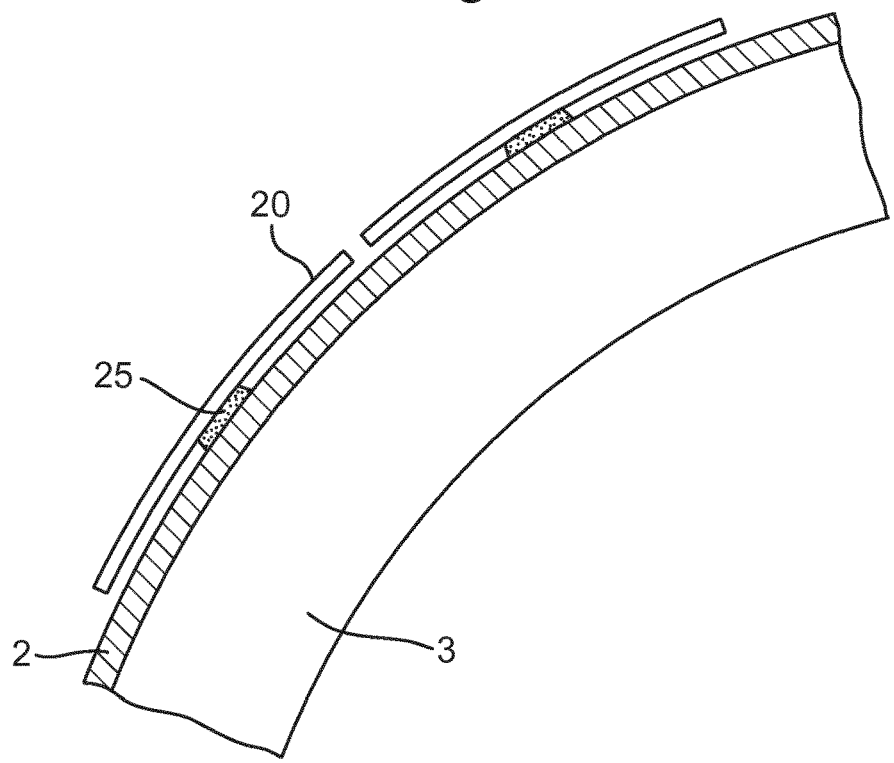

In an arrangement, at least one connector may be configured such that it ruptures under an impact to the outer place, namely breaks that connection between the outer plate and the remainder of the helmet. For example, as shown in FIG. 7, in an arrangement, an outer plate 20 may be connected to relatively hard layer 2 by a section of adhesive 25. The section of adhesive 25 may be configured such that, under an impact exceeding a threshold force, the adhesive ruptures, releasing the outer plate 20.

Other arrangements of connectors that rupture may also be used. For example, an elongate connector similar in appearance to that depicted in FIG. 6 or another mechanical fixing may be used which is configured such that, under an impact to an outer plate above a threshold value, the elongate connection is subjected to a breaking strain, for example under tension or shear. In order to ensure the desired rupturing behaviour, a structural weakness may be deliberately introduced into the connector.

Figure 8:
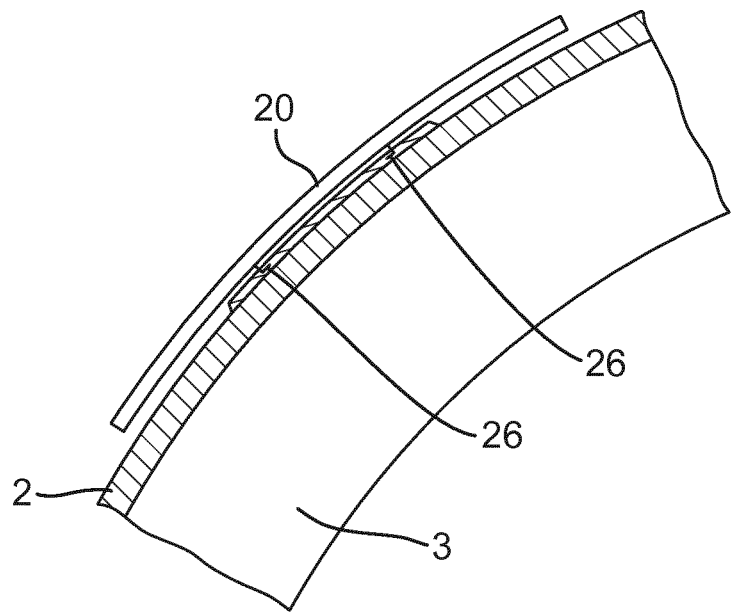

As shown in FIG. 8, which depicts a further example of a rupturing connector, one or more pins 26 may be provided to connect the outer plate 20 to the relatively hard outer layer. Under an impact above a given threshold, the one or more pins 26 may be configured to break and/or to break off from the outer plate 20 and/or break off from the relatively hard layer 2.

In some arrangements, the rupturing of the connector 25 may result in complete release of the outer plate 20 such that it is no longer connected to the reminder of the helmet. In other arrangements, an outer plate 20 may be connected by a first type of connector 25 that ruptures under an impact and a second type of connector that is not sufficient alone to fully secure the outer plate to the remainder of the helmet in the absence of an impact. In such an arrangement, after the rupture of the first type of connector, the second type of connector may prevent the outer plate from entirely breaking free from the remainder of the helmet.

In an arrangement, at least one connector may be configured to detachably connect the outer plate. For example, the connector may be configured such that it can be detached and re-attached multiple times. Such a connector may be configured such that, under an impact above a given threshold, the connector detaches.

Figure 9:
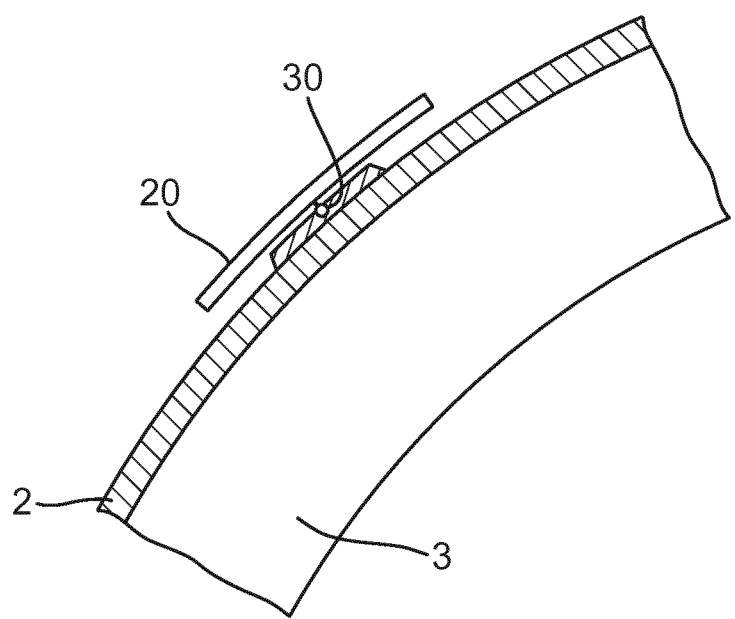
Figure 10:
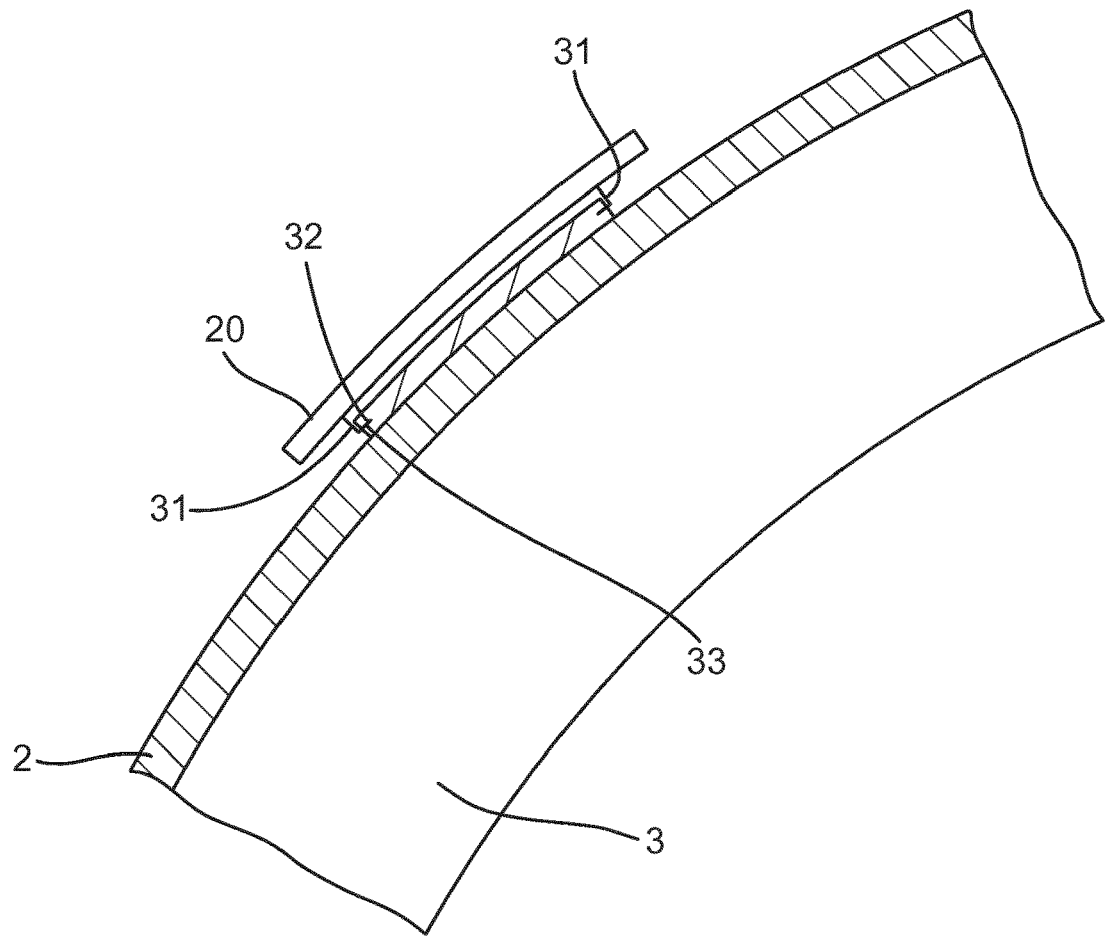

For example, FIG. 9 depicts an outer plate 20 connected via a snap-fit connector 30. FIG. 10 depicts a further example of a snap-fit connection, in particular a so-called spring snap pin configuration. As depicted in FIG. 10, the spring snap pin connector may include one or more pins 31 that at one end are connected to an outer plate 20. The other end of the pins 31 include a protrusion 32 that fits within a corresponding recess 33 within a part of the relatively hard layer 2. The connector is released by flexing at least one of the pins 31 such that the protrusion 32 withdraws from the corresponding recess 33. The flexing of the pins 31 may be an elastic deformation.

It should be appreciated that the arrangement depicted in FIG. 10 for at least one of the pins 31 may be reversed, such that the pin 31 is connected to the relatively hard layer 2 and has a protrusions 32 accommodated within a corresponding recess within a part of the outer plate 20.

Other releasable connections may also be used to connect the outer plates 20 to the relatively hard layer. For example friction fit connectors and/or magnetic connections may also be used.

Figure 11:
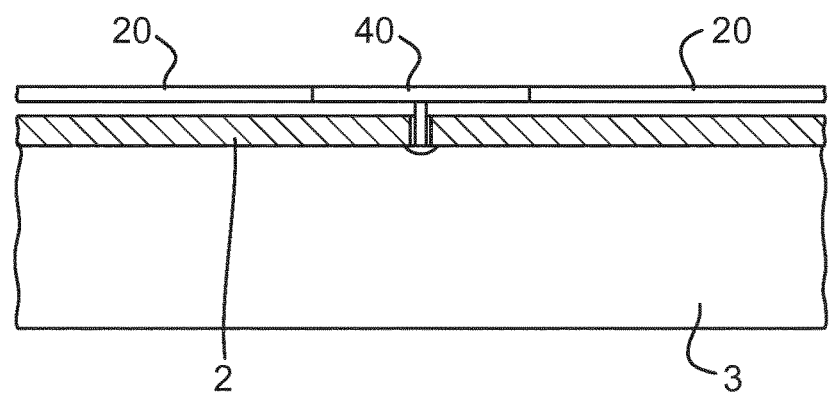

In an arrangement, at least one connector may be used to connect the edge of the outer plates to the remainder of the helmet. For example, as depicted in FIG. 11, a connector 40 may be provided that resiliently connects the edge of one outer plate to the edge of an adjacent outer plate and connects both to the relatively hard layer. The connector 40 may be configured such that, under an impact to one or both of the outer plates 20 to which it is connected, it deforms, for example elastically, or ruptures, in the manner discussed above. In an arrangement, the connector 40 may be co-moulded to the outer plates 20.

Figure 12:
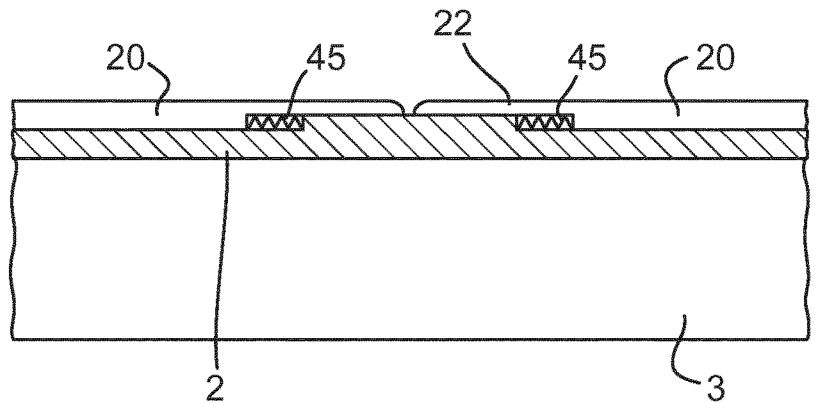

In some arrangements, such as is shown in FIG. 12, one or more connectors 45 may be provided that connect a peripheral part of a respective outer plate 20 to the relatively hard layer 2. Such connections 45 may be configured such that, under an impact, they may deform, for example elastically, or rupture, in the manner discussed above. As shown in FIG. 12., the connections 45 may be arranged to be located between the relatively hard layer 2 and an extension 22 of the outer plate 20. Such an arrangement may be provided such that the connector 45 is not visible and/or to reduce the likelihood of the connector 45 being damaged.

In an arrangement that may be combined with any of the arrangements discussed above, at least one outer plate may be configured such that, in the absence of an impact to the outer plate, it has a convex shape when viewed from the outside of the helmet. Such an arrangement is depicted in FIG. 13. As shown in FIG. 14, the outer plate 20 may be further configured such that, as the result of an impact I the outer plate 20 may change to a concave shape when viewed from outside the helmet. Such an arrangement may facilitate the release of the outer plate 20 from the connectors that secure it, as in an arrangement such as that depicted in FIG. 14 in which the outer plate 20 detaches from the connectors.

However, it should be understood that such an arrangement of an outer plate 20 that has a convex shape in the absence of an impact may alternatively or additionally be used with an arrangement in which at least one connector deforms such that the outer plate 20 remains connected to the connector. FIG. 15 and FIG. 16 for example, depict such an arrangement under no impact and under an impact I to an outer plate 20, respectively. As shown in this example, the connectors 50 may be arranged to connect the edges of the outer plates 20 to the relatively hard layer but are configured such that they may deform to permit the edge of one outer plate 20 to move relative to the edge of an adjacent outer plate 20 to move relative to the edge of an adjacent outer plate 20.

In the arrangement depicted in FIGS. 15 and 16, there may also be provided a pair of magnets 51, 52. The magnets 51, 52 may be arranged such that one is mounted on an outer plate 20 and the other is mounted on the relatively hard layer 2 and such that they repel each other. Such an arrangement may promote the convex shape of the outer plate 20 in the absence of an impact to the outer plate 20.

In general, outer plates that are configured to change from a convex shape to a concave shape under an impact may be configured such that they deform elastically between said shapes and can be repeatedly switched from one shape to another. In an arrangement, when the outer plate is in its convex shape, it may be elastically deformed relative to its unstressed state. For example, the outer plate may be forced into the convex shape by one or more connectors while they remain secured. Such an arrangement may promote the outer plate, when released, switching to the concave shape.

FIGS. 17 and 18 depict a further arrangement of an outer plate 20 in the absence of an impact and after an impact I on the outer plate 20, respectively. In this arrangement, a connector 60 is provided to secure a central region of the outer plate 20 to the relatively hard layer. The connector 60 includes a section 61 that extends from the surface of the outer plate 20 to an inner plate 62. When the outer place 20 is in its convex shape it holds the inner plate 62 within a corresponding recess 63 within the relatively hard layer 2. While the inner plate 62 is within the recess 63, the outer plate 20 may be prevented from sliding across the surface of the relatively hard layer 2. As shown in FIG. 18, after an impact I, the outer plate 20 switches to its concave shape, releasing the inner plate 62 from the recess 63, permitting the outer plate 20 to slide relative to the relatively hard layer 2.

FIG. 19 depicts a further arrangement of the outer plates 20. As shown, in such an arrangement, the outer plates 20 are freely mounted on the relatively hard layer 2. An outer layer of deformable material 65 is provided outside of the outer plates 20. The outer later of material 65 may be formed from a fabric, textile or another flexible thin sheet of material. The outer plates 20 are connected to the outer layer of material 65 at respective locations. In such an arrangement the outer layer of material may function as a connector, connecting the outer plates 20 to the remainder of the helmet and maintaining their initial position relative to each other and relative to the relatively hard layer 2. Under an impact to an outer plate 20, the outer later of material 65 may deform, enabling sliding of the outer plate 20 relative to the relatively hard layer 2 and relative to other outer plates 20.

In an arrangement, the outer surface of a helmet may be divided into a number of outer plates, shaped to provide coverage of the outer surface of the helmet. For example, FIG. 20 depicts a helmet in which the outer surface is divided into a front outer plate 70, a rear outer plate 71, a left outer plate 72 and a right outer plate 73.

In other arrangements, the outer plates may include a repeating pattern of standard outer plate shapes. For example, the outer plates may be a plurality of any one of triangles, squares, rectangles, diamonds, pentagons, hexagons, circles, ellipses and tear drops. In some arrangements, there may be gaps between edges of adjacent outer plates. Such gaps may provide space in which one or more connectors are provided as discussed above. Alternatively or additionally, in some arrangements, the edge of at least one outer plate may overlap an edge of an adjacent outer plate. Furthermore, in some arrangements, a repeating pattern of two standard outer plate shapes may be used in order to conform to the shape of the outer surface of a helmet.

In some arrangements, the outer plates may be arranged over all of the outer surface of the helmet. Alternatively, one or more outer plates may be mounted in one or more regions of the outer surface of the helmet, with no such outer plates provided in one or more other regions of the outer surface of the helmet. Such an arrangement may be appropriate for a helmet that in use is more likely to sustain significant oblique impacts in particular regions.

In use, helmets may be subjected to impacts from substantially any direction. However, depending on the use of a helmet, impacts from some directions may be more common than others. In addition, for given force of impact, an impact on a helmet in one direction may cause more damage to the wearer of the helmet than an impact from another direction. Therefore, in an arrangement, the outer plates and/or the connection of the outer plates may be configured to provide a different response for impacts in different directions. In particular, an outer plate may be mounted on the relatively hard layer such that the force required to release it, namely for it to move relative to the relatively hard layer, may be different for an impact from one angle relative to an impact from another angle. For example, for an outer plate mounted towards the front of a helmet, it may be configured to release more easily for an impact from the front than for an impact from the side of the head. Such optimisation of the conditions under which outer plates release may differ for different regions of the helmet.

Variations of the above described embodiment are possible in light of the above teachings. It is to be understood that the invention may be practised otherwise than specifically described herein without departing from the spirit and scope of the invention.

The invention claimed is:

1. A helmet comprising:
   an energy absorbing layer;
   an outer layer that is harder than the energy absorbing layer and is formed outward of the energy absorbing layer;
   a plurality of outer plates formed from a material that is harder than the energy absorbing layer, the plurality of outer plates mounted on an outer surface of the outer layer, such that a whole outer plate is located outward of the outer layer; and
   a plurality of connectors associated with each outer plate, each respective plurality of connectors configured to secure each respective outer plate to the outer layer in the absence of an impact;
   wherein the outer plates are mounted on the outer layer such that, under an oblique or tangential impact to at least one outer plate of the plurality of outer plates, the whole at least one outer plate is free to slide across the outer layer, with said at least one outer plate directly contacting the outer layer, and move relative to other outer plates of the plurality of outer plates, so as to redirect rotational impact energy and reduce the transfer of rotational forces to the remainder of the helmet;
   the plurality of connectors associated with the at least one outer plate are configured to permit the at least one outer plate to slide across the outer layer under the oblique or tangential impact to the at least one outer plate;

a low friction interface is provided between the outer surface of the outer layer and at least a part of the surface of the outer plates that is capable of contacting the outer surface of the outer layer under the oblique or tangential impact to an outer plate, and the friction is sufficiently low that, under the forces associated with an impact that the helmet is designed to withstand, the oblique or tangential impact to the at least one outer plate causes the at least one outer plates to slide relative to the outer layer so as to redirect rotational impact energy and reduce the transfer of rotational forces to the remainder of the helmet; and sliding of the at least one outer plate relative to the outer layer, under the oblique or tangential impact to the at least one outer plate, comprises translation of the at least one outer plate relative to the outer surface of the outer layer.

2. A helmet according to claim 1, wherein the plurality of outer plates form the outermost layer of the helmet.

3. A helmet according to claim 1, wherein each respective plurality of connectors is configured to secure each respective outer plate to the energy absorbing layer and the outer layer in the absence of the impact.

4. A helmet according to claim 1, wherein at least one of said plurality of connectors is provided in a central region of the associated outer plate.

5. A helmet according to claim 1, wherein at least one of said plurality of connectors is provided at an edge of the associated outer plate.

6. A helmet according to claim 1, further comprising at least one connector associated with at least one outer plate, the at least one connector configured to secure the at least one outer plate to an adjacent outer plate in the absence of an impact.

7. A helmet according to claim 1 wherein at least one connector of said plurality of connectors is configured to deform under an impact to the outer plate associated with the at least one connector.

8. A helmet according to claim 7, wherein the at least one connector is configured to deform elastically under an impact to the outer plate associated with the at least one connector.

9. A helmet according to claim 7, wherein the at least one connector is formed from an elastic fabric.

10. A helmet according to claim 1, wherein at least a first connector of said plurality of connectors is configured to rupture under an impact to the outer plate associated with the at least one connector.

11. A helmet according to claim 10, wherein the first connector is an adhesive.

12. A helmet according to claim 1, wherein at least one connector of said plurality of connectors is configured to secure at least one of the plurality of outer plates in an initial position by at least one of a snap-fit, screw, mechanical fixing, magnet or a friction fit element in the absence of an impact to the at least one outer plate associated within the at least one connector; and the at least one snap-fit, screw, mechanical fixing, magnet or friction fit element is configured to release the at least one outer plate under an impact to the at least one outer plate.

13. A helmet according to claim 1, wherein at least one outer plate of said plurality of outer plates is configured such that, in the absence of an impact to the at least one outer plate, the at least one outer plate has a convex shape when viewed from outside of the helmet and, under an impact to the at least one outer plate, changes to a concave shape when viewed from outside of the helmet.

14. A helmet according to claim 3, wherein at least one outer plate of said plurality of outer plates is configured such that, in the absence of an impact to the at least one outer plate, the at least one outer plate has a convex shape when viewed from outside of the helmet and, under an impact to the at least one outer plate, changes to a concave shape when viewed from outside of the helmet; and wherein the plurality of connectors are configured such that the change of shape of the at least one outer plate releases the at least one outer plate to slide relative to the outer layer.

15. A helmet according to claim 13, wherein the at least one outer plate is connected to an associated inner plate provided on the inner surface of the outer layer; and when said outer plate is in a convex shape, the inner plate is pressed against the inner surface of the outer layer which at least partially secures the at least one outer plate to the outer layer in the absence of an impact to the at least one outer plate.

16. A helmet according to claim 15, further comprising a recess formed in the inner surface of the outer layer, configured to receive and secure the position of the inner plate relative to the outer layer in the absence of an impact to the at least one outer plate.

17. A helmet according to claim 13, wherein the at least one outer plate deforms elastically between said convex and concave shapes.

18. A helmet according to claim 13, wherein, when the at least one outer plate is in said convex shape, it is elastically deformed relative to an unstressed state.

19. A helmet according to claim 1, further comprising an outer layer of material provided outside of the plurality of outer plates;

wherein the outer plates are connected to the outer layer of material at respective locations; and the outer layer of material is configured to be able to deform to enable movement of the outer plates relative to each other and relative to the outer layer under an impact to an outer plate.

20. A helmet according to claim 1, wherein the outer plates include a repeating pattern of one or two outer plate shapes.

21. A helmet according to claim 20, wherein at least one outer plate shape is a triangle, a square, a rectangle, a diamond, a pentagon, a hexagon, a circle, an ellipse and a teardrop.

22. A helmet according to claim 1, wherein at least one outer plate is mounted on the outer layer such that, in order to release the at least one outer plate to slide across the outer layer in response to an oblique impact, the required force component of the oblique impact on the at least one outer plate in a direction tangential to a surface of the at least one outer plate is greater for a first direction of oblique impact than for a second direction of oblique impact, where the first and second directions have different angles around an axis perpendicular to the surface of the at least one outer plate when projected onto the surface of the at least one outer plate.

* * * * *